(12) United States Patent
Kim et al.

(10) Patent No.: US 9,877,159 B2
(45) Date of Patent: Jan. 23, 2018

(54) USER TERMINAL APPARATUS AND CONTROLLING METHOD THEREOF

(71) Applicant: SAMSUNG ELECTRONICS CO., LTD., Suwon-si, Gyeonggi-do (KR)

(72) Inventors: Du-seok Kim, Yongin-si (KR); Hyun-cheol Park, Suwon-si (KR); Jeong-jin Song, Seoul (KR); Seung-chur Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/070,069

(22) Filed: Mar. 15, 2016

(65) Prior Publication Data
US 2016/0337794 A1 Nov. 17, 2016

Related U.S. Application Data

(60) Provisional application No. 62/159,511, filed on May 11, 2015.

(30) Foreign Application Priority Data

Oct. 14, 2015 (KR) ........................ 10-2015-0143662

(51) Int. Cl.
| | | |
|---|---|---|
| H04W 24/00 | (2009.01) | |
| H04W 4/02 | (2009.01) | |
| H04W 4/00 | (2009.01) | |

(52) U.S. Cl.
CPC ........... *H04W 4/023* (2013.01); *H04W 4/005* (2013.01); *H04W 4/027* (2013.01)

(58) Field of Classification Search
CPC ...... H04W 4/023; H04W 4/005; H04W 4/027
USPC ........... 455/457; 719/313; 701/202; 600/595
See application file for complete search history.

(56) References Cited

U.S. PATENT DOCUMENTS

| | | | |
|---|---|---|---|
| 8,078,152 B2 | 12/2011 | Partridge et al. | |
| 8,768,876 B2 | 7/2014 | Shim et al. | |
| 2008/0033637 A1 | 2/2008 | Kuhlman et al. | |
| 2011/0105957 A1* | 5/2011 | Kourogi ................. | G01C 21/26 600/595 |
| 2013/0310075 A1 | 11/2013 | Lim et al. | |

(Continued)

FOREIGN PATENT DOCUMENTS

WO 2012/072865 6/2012

OTHER PUBLICATIONS

Search Report and Written Opinion dated Jul. 20, 2016 in counterpart International Patent Application No. PCT/KR2016/002147.

*Primary Examiner* — Charles Shedrick
(74) *Attorney, Agent, or Firm* — Nixon & Vanderhye P.C.

(57) ABSTRACT

A user terminal apparatus is provided. The user terminal apparatus includes a sensor configured to sense a movement of the user terminal apparatus, a storage configured to store a plurality of movement patterns and place information for each time period matching with each movement pattern, and a processor configured to, in response to the movement sensed by the sensor corresponding to one of the plurality of movement patterns, determine a place where the user terminal apparatus is located using a movement pattern corresponding to the sensed movement and place information matching with a present time.

16 Claims, 12 Drawing Sheets

(56) References Cited

U.S. PATENT DOCUMENTS

2014/0337861 A1 11/2014 Chang et al.
2014/0378159 A1 12/2014 Dolbakian et al.

* cited by examiner

USER TERMINAL APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2015-0143662, filed in the Korean Intellectual Property Office on Oct. 14, 2015, and to U.S. Provisional Patent Application No. 62/159,511, filed in the United States Patent and Trademark Office on May 11, 2015, the disclosures of which are incorporated by reference herein in their entireties.

BACKGROUND

1. Field

The disclosure relates generally to a user terminal apparatus and a controlling method thereof, and for example, to a user terminal apparatus capable of recognizing the place where a user is located and a controlling method thereof.

2. Description of Related Art

Recently, with the development of wireless communication technologies, the use of mobile terminal apparatuses has increased rapidly. In particular, as smart phones are widely used, applications providing various services using a user's personal usage log data have been developed. Such smart phones are generally equipped with a GPS module, and may provide services such as map information, navigation, etc. of the surrounding areas based on information on the user's current location using a GPS signal.

The GPS module provides a user's exact location using a satellite, and calculates the current location using a triangular surveying method by measuring exact time and distance of a signal received from more than three satellites. A mobile terminal apparatus, etc. having the GPS module may execute a program and inform the place where a user is located by displaying the current location of the mobile terminal apparatus on a map based on the signal received through a GPS receiver.

However, the GPS receiver which can receive a GPS signal consumes power which is limited in a battery of the mobile terminal apparatus and thus, whenever location information is collected, a great amount of power is consumed. In particular, in a building or in an area where GPS satellite transmission is compromised due to obstruction, fading, reflection, etc., the GPS receiver may not perform its function properly.

In this regard, as the type of sensors provided in a mobile terminal apparatus has increased and the type of data collectable from a mobile terminal apparatus has become diverse, a solution to estimate the place where a user is located by utilizing the previously-collected data is suggested.

SUMMARY

An aspect of the example embodiments relates to a user terminal apparatus capable of reducing power consumed in the user terminal apparatus by estimating the place where a user is located based on data collected from various sensors of a mobile terminal apparatus, and a controlling method thereof.

According to an example embodiment, a user terminal apparatus is provided including a sensor configured to sense a movement of the user terminal apparatus, a storage configured to store a plurality of movement patterns and place information for each time period matching each movement pattern, and a processor configured to, in response to the movement sensed by the sensor corresponding to one of the plurality of movement patterns, determine an estimated place where the user terminal apparatus is located using a movement pattern corresponding to the sensed movement and place information matching with a present time.

The apparatus may further include a location detector configured to detect coordinate information of a point where the user terminal apparatus is located, and the storage may further store coordinate information of a location corresponding to the place information for each time, and the processor, in response to a movement pattern of the user terminal apparatus sensed by the sensor being changed, may be configured to control the location detector to detect coordinate information of a current location of the user terminal apparatus, and update place information stored in the storage based on the detected coordinates information and time information regarding a point of time when the coordinate information is detected.

The processor, in response to a movement pattern of the user terminal apparatus being changed within a predetermined time from a time when the coordinate information is detected at a last time by the location detector, may be configured to estimate and detect a location based on the coordinate information detected at the last time as a location of the user terminal apparatus.

The processor, in response to a plurality of coordinate information being detected based on a movement of the user terminal apparatus, which is sensed in a time period, may be configured to cluster the plurality of coordinate information to at least one cluster based on a density of the plurality of coordinate information, to extract coordinate information at a center of the cluster based on a stay time for each coordinate information, and to update place information stored in the storage based on the extracted coordinate information.

The movement pattern may include at least one of a first movement pattern where a movement to a place at a speed exceeding a critical range is sensed for more than a predetermined time, a second movement pattern where a movement to a place at a speed less than a critical range is sensed for more than a predetermined time, and a third movement pattern where a movement to a place is not sensed for more than a predetermined time.

The storage may further store a plurality of state information regarding an operation of the user terminal apparatus and place information matching each state information, and the processor may be configured to determine a place where the user terminal apparatus is located further using place information corresponding to an operation state of the user terminal apparatus from among place information matching the state information stored in the storage.

The apparatus may further include a display, and the processor, in response to a map application being executed, may be configured to control the display to display a map and to display the determined estimated place on the map.

The processor, in response to an application being executed, may be configured to provide the determined estimated place as an input of the application.

According to an example embodiment, a method of controlling a user terminal apparatus is provided including sensing a movement of the user terminal apparatus, determining whether the sensed movement corresponds to one of a plurality of pre-stored movement patterns which are matched with place information for each time period, and in response to the sensed movement corresponding to one of the plurality of pre-stored movement patterns, determining an estimated place where the user terminal apparatus is located using a movement pattern corresponding to the sensed movement and place information matching a present time.

The method may further include, in response to a movement pattern of the user terminal apparatus being changed, detecting coordinate information of a current location of the user terminal apparatus, and updating place information for each time period using time information regarding a point of time when the coordinate information is detected and pre-stored coordinate information regarding a location corresponding to the place information for each time period.

The detecting may include, in response to a movement pattern of the user terminal apparatus being changed within a predetermined time from a time when the coordinate information is detected at a last time, estimates and detects a location based on the coordinate information detected at the last time as a location of the user terminal apparatus.

The updating may include, in response to a plurality of coordinate information being detected based on a movement of the user terminal apparatus, which is sensed by a time period, clustering the plurality of coordinate information in at least one cluster based on a density of the coordinate information, extracting coordinate information at a center of the cluster based on a stay time for each coordinate information, and updating place information stored for the time period based on the extracted coordinate information.

The movement pattern may include at least one of a first movement pattern where a movement to a place at a speed exceeding a critical range is sensed for more than a predetermined time, a second movement pattern where a movement to a place at a speed less than a critical range is sensed for more than a predetermined time, and a third movement pattern where a movement to a place is not sensed for more than a predetermined time.

The method may further include determining whether an operation state of the user terminal apparatus corresponds to one of a plurality of pre-stored state information regarding an operation of the user terminal apparatus which is matched with place information, and the determining an estimated place of the user terminal apparatus may include, in response to an operation state information of the user terminal apparatus corresponding to one of the plurality of pre-stored state information, determining an estimated place where the user terminal apparatus is located further using place information corresponding to the operation state of the user terminal apparatus.

The method may further include, in response to a map application being executed, displaying a map and displaying the determined estimated place on the map.

The method may further include, in response to an application being executed, providing the determined estimated place as an input of the application.

According to the above-described various example embodiments, a place where a user terminal apparatus is located may be estimated effectively while reducing power consumption according to a GPS operation.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Figure 1:
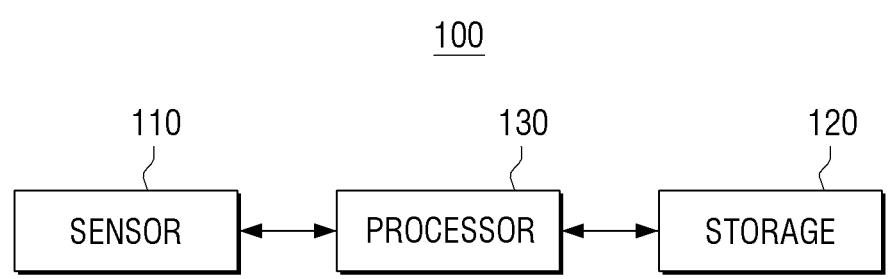
FIG. 1 is a block diagram illustrating an example configuration of a user terminal apparatus.

Hereinafter, example embodiments of the disclosure will be described in greater detail with reference to the accompanying drawings.

The example embodiments of the disclosure may be diversely modified. Accordingly, specific example embodiments are illustrated in the drawings and are described in greater detail in the detailed description. However, it is to be understood that the disclosure is not limited to any specific example embodiment, but includes all modifications, equivalents, and substitutions without departing from the scope and spirit of the disclosure. Also, well-known functions or constructions may not be described in detail if they may obscure the disclosure with unnecessary detail.

FIG. 1 is a block diagram illustrating an example configuration of a user terminal apparatus.

Referring to FIG. 1, a user terminal apparatus 100 may include, for example, a sensor (e.g., including a sensor including sensing circuitry) 110, a storage 120 and a processor (e.g., including processing circuitry) 130.

The user terminal apparatus 100 may, for example, be a mobile electronic apparatus including a communication function. For example, the user terminal apparatus 100 may include at least one of a smart phone, a table Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a navigation, a camera, and a wearable device, or the like, and the wearable device may include a Head Mounted Device (HMD) such as an e-glasses, an e-clothes, an e-bracelet, an e-necklace, an e-accessory, a smart watch, etc. However, it will be apparent to those skilled in the related art that the user terminal apparatus 100 according to an example embodiment is not limited to the above-described devices.

The sensor 110 senses a movement of the user terminal apparatus 100. The sensor 110 may include at least one of an acceleration sensor (not shown), a magnetic sensor (not shown) and a gyro sensor (not shown), or the like. Those various sensors included in the sensor 110 may, for example, sense a three-dimensional movement of the user terminal apparatus 100 through a combination of one or more sensors.

The acceleration sensor is sensor that may measure a spatial movement of the user terminal apparatus 100. The acceleration sensor may, for example, refer to a sensor which senses changes in the acceleration and/or the angular acceleration generated when a user moves the user terminal apparatus 100. The acceleration sensor may sense acceleration in the directions of three axes. In addition, the acceleration sensor may sense a gradient of the user terminal apparatus 100.

The geomagnetic sensor may, for example, be a sensor to measure an azimuth. The geomagnetic sensor may, for example, refer to a sensor which measures an azimuth by sensing a magnetic field formed toward the south and north directions of the earth. The geomagnetic sensor may sense geomagnetism toward the directions of three axes. The northern direction measured by the geomagnetic sensor may, for example, be magnetic north. However, even when the geomagnetic sensor measures the direction of the magnetic north, the direction of the true north may be output through internal calculation.

The gyro sensor may, for example, be an inertia sensor that measures rotation angular velocity of the user terminal apparatus 100. The gyro sensor may, for example, refer to a sensor which recognizes a current direction using an inertia force of a rotating object. The gyro sensor may measure a rotation angular velocity toward the directions of two axes.

The sensor 110 may generate a movement pattern by sensing a movement of the user terminal apparatus 100. For example, the movement pattern may include a value which is generated through the sensor 110 based on a movement of the user terminal apparatus 100 or a pattern value which is generated using the generated value.

The storage 120 stores a plurality of movement patterns of the user terminal apparatus 100 and place information for a time period matching each movement pattern.

For example, the movement pattern stored in the storage 120 may include at least one of a first movement pattern where a movement to a place at a speed exceeding a critical range is sensed for more than a predetermined time, a second movement pattern where a movement to a place at a speed less than a critical range is sensed for more than a predetermined time, and a third movement pattern where a movement to a place is not sensed for more than a predetermined time.

For example, if a user gets on an electric vehicle which moves at the average speed of 80 km/h for 30 minutes, a movement sensed by the user terminal apparatus 100 which is carried out by the user may be included in the first movement pattern and stored in the storage 120. If the user walks at the average speed of 10 km/h for an hour, a movement sensed by the user terminal apparatus 100 which is carried out by the user may also be included in the first movement pattern and stored in the storage 120. If a movement sensed by the user terminal apparatus stays at the average speed of below 0.1 km/h for 6 hours, the movement may be included in the second movement pattern and stored in the storage 120. If the user terminal apparatus 100 is placed at a certain location for more than 2 hours or if the user manipulates the user terminal apparatus 100 only at home or at an office, the movement may be included in the third movement pattern where a movement based on a change in the location of the user terminal apparatus 100 is not sensed and stored in the storage 120.

For example, the first movement pattern may include a riding pattern where a user gets on a transportation means such as an electric vehicle or a bus and moves on the transportation means. The second movement pattern may include a walking pattern or a running pattern which follows a user's walking or running movement. The third movement pattern may include a stay pattern where a user does not move to another place.

The method of estimating a place where the user terminal apparatus 100 is located will be described with reference to a stay pattern where a movement to another place is not sensed.

For example, each movement pattern may be matched with place information for each time period and stored. The place information for each time period refers to information indicating the place where a user is present based on a time period. For example, a stay pattern where a movement of the user terminal apparatus 100 to another place is not sensed from 11:00 pm to 7:00 am may be matched with place information of the user's 'house'. Alternatively, for a riding pattern sensed in the user terminal apparatus 100 from 8:00 am to 8:30 am, place information regarding a user's start point may be matched with 8:00 am when is the start time of the riding pattern, place information regarding the user's arrival point may be matched with 8:30 when is the finish time of the riding pattern, and each place information based on the operation of an electric vehicle may be matched with the time from 8:00 am to 8:30 am.

For example, each place information may be detected through a location detector or may be information regarding the names of places corresponding to coordinates within a predetermined range, which may, for example, be input by a user in advance. For example, the place information may include the names of main places which are regularly visited by a user, such as house, office, fitness center, etc.

In addition, the storage 120 may further store a plurality of state information regarding the operation of the user terminal apparatus 100 and place information matching with each state information, which will be further described in greater detail below.

The processor 130 may be configured to control overall operations of the user terminal apparatus 100. If a movement sensed by the sensor 110 corresponds to one of a plurality of movement patterns, the processor 130 may be configured to determine the place where the user terminal apparatus 100 is located using a movement pattern corresponding to the sensed movement from among place information stored in the storage and place information matching with the present time.

For example, if the present time is 1:00 am and no movement of the user terminal apparatus 100 is sensed, the processor 130 may determine that the place where the user terminal apparatus 100 is currently located is his or her house based on the place information for each time period matching with a stay pattern stored in the storage.

If a user works at an office from 9:00 am to 6:00 pm and the user terminal apparatus 100 moves based mostly on a stay pattern, the stay pattern of the user terminal apparatus from 9:00 am to 6:00 pm may, for example, be matched with the place information of 'office' and stored.

Based on such information, if the present time is 12:00 pm and a movement of the user terminal apparatus 100 corresponds to the stay pattern, the processor 130 may determine that the place where the user terminal apparatus 100 is currently located is 'office' based on the place information for a time period matching with the stay pattern stored in the storage 120.

Such matching information may be determined stochastically from movement pattern information and place information which is accumulatively stored based on the usage of the user terminal apparatus 100, and may be set and registered by a user.

A user uses the user terminal apparatus 100 in a different form based on a place. For example, the time or the frequency of using the user terminal apparatus 100, or the type of application used may have a different pattern based on each place. For example, if a user sleeps at a place like a house, the user terminal apparatus 100 is not in use for a prolonged period of time. In this example, the processor 130 may be configured to recognize temporal characteristics of the time when the user terminal apparatus 100 is not in use or the place where the user terminal apparatus 100 is located.

By further using the place information corresponding to the operation state of the user terminal apparatus 100 from among place information matching the state information stored in the storage 120, the processor 130 may be configured to determine the place where the user terminal apparatus 100 is located. For example, the state information stored in the storage 120 may include various usage information including at least one of information regarding an application executed on the user terminal apparatus 100 as state information regarding the operation of the user terminal apparatus 100, ON/OFF information of a display screen when the user terminal apparatus 100 includes a display, information regarding the display screen in a screen unlocking state, information regarding a battery level, information regarding whether the battery is being recharged, information regarding the type of recharger connected to the user terminal apparatus 100, and information regarding the connection state of Wi-Fi or Bluetooth. For example, the information regarding an application which is executed on the user terminal apparatus 100 may include information regarding the type of the corresponding application, the number of execution, the period of execution, etc.

The processor 130 may be configured to determine the place where the user terminal apparatus 100 is currently located by further using place information matching state information regarding the operation of the user terminal apparatus 100.

For example, if there is an application which is mainly executed at a specific place and the corresponding application is executed, the processor 130 may be configured to estimate that it is highly likely that the user terminal apparatus 100 is located at the specific place. For example, if the place where a user executes an application for document work and performs document work on the user terminal apparatus 100 is mainly an office and the application for document work is executed at 2:00 pm, the processor 130 may estimate that it is highly likely that the user is at the office.

In addition, the ON/OFF information of a display screen and information regarding whether a screen is unlocked may be included in the state information of the user terminal apparatus 100. The processor 130 may be configured to determine whether the user terminal apparatus 100 is currently being used by a user based on the screen state of the user terminal apparatus 100, and if the user terminal apparatus 100 is not in use, may determine that the user terminal apparatus 100 is located at a place where the user terminal apparatus 100 exists in its non-use state based on the present time. For example, if the user terminal apparatus 100 is not in use at 2:00 am, the processor 130 may be configured to determine that the user terminal apparatus 100 is at a user's house where the user is sleeping.

The information regarding a battery level may be included in the state information of the user terminal apparatus 100. In addition, the information regarding whether a battery is being recharged may be included in the state information of the user terminal apparatus 100. For example, if a user usually recharges the user terminal apparatus 100 at home and the battery is being recharged, the processor 130 may be configured to determine that the user terminal apparatus 100 is located at the user's house. If the type of recharger through which the user recharges he user terminal apparatus 100 varies depending on a place such as house, office, etc., the processor 130 may be configured to estimate the place where the user terminal apparatus 100 based on the information regarding the type of the connected recharger being used while the battery is being recharged.

The processor 130 may be configured to estimate the place where the user terminal apparatus 100 is located using matching information between the state and place of the user terminal apparatus 100, which is stored in the storage 120, and such matching information may be determined stochastically from state information and place information which is accumulatively stored based on the usage of the user terminal apparatus 100, and may be set and registered by a user.

Figure 2:
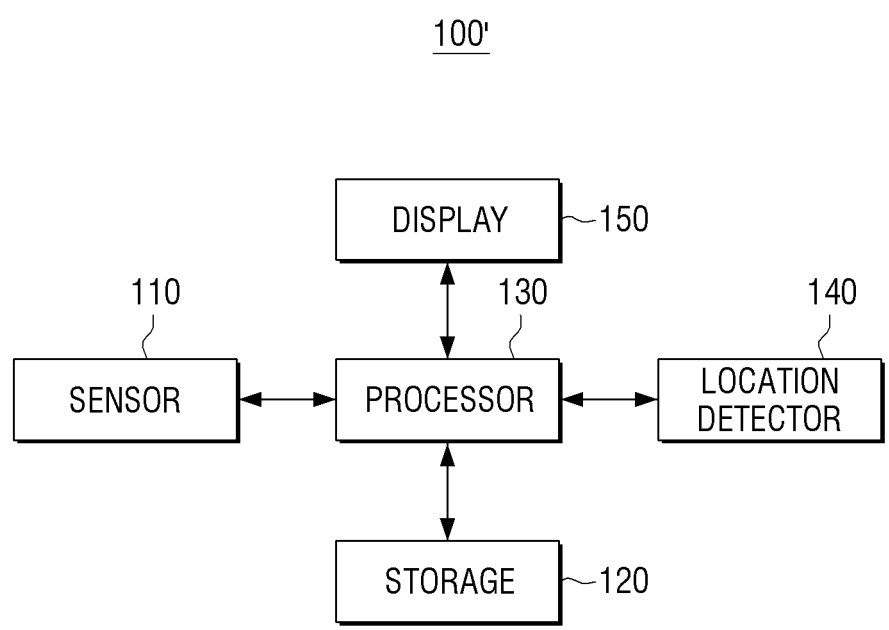
FIG. 2 is a block diagram illustrating an example configuration of a user terminal apparatus.

FIG. 2 is a block diagram illustrating an example configuration of a user terminal apparatus. According to the example embodiment of FIG. 2, a user terminal apparatus 100' may further include a location detector (e.g., including location detection circuitry) 140 and a display (e.g., including a display panel) 150.

The location detector 140 detects coordinate information regarding a point where the user terminal apparatus 100' is located. The location detector 140 may, for example, receive a Global Positioning System (GPS) signal using a satellite, a Wi-Fi Positioning System (WPS) signal using wireless-LAN information of a neighboring Access Point (AP), or a Cell Position System (CPS) signal from a mobile communication base station, and determine the coordinates of the present location based on the received signal.

For example, the location detector 140 may determine the present location coordinates of the user terminal apparatus 100' by filtering and amplifying the GPS signal received through an antenna (not shown) through an RF tuner (not shown), performing processing such as, for example, A/D conversion, demultiplexing, signal compensation and amplification, etc. through a base band unit (not shown), and then use a triangular surveying method.

Whenever the movement pattern of the user terminal apparatus 100' sensed by the sensor 110 changes, the processor 130 may be configured to control the location detector 140 to detect the coordinate information regarding the present location of the user terminal apparatus 100', and update the place information stored in the storage 120 using the detected coordinate information and information regarding the time when the coordinate information is detected. For example, if the user terminal apparatus 100' performs communication using Wi-Fi, the location detector 140 may estimate the place where the user terminal apparatus 100' is located by preferentially using Wi-Fi connection information which was collected previously. If there is no Wi-Fi connection information and the user terminal apparatus 100' performs communication using 3G or LTE communication network, the location detector 140 may estimate the place where the user terminal apparatus 100' is located from information regarding the corresponding communication network. If the user terminal apparatus 100' does not have connection information with respect to 3G or LTE network either, the location detector 140 may detect the coordinates of a point where the user terminal apparatus 100' is located using GPS.

The processor 130 may be configured to detect and store the location of the user terminal apparatus 100' through the location detector 140 only when there is a change in a movement pattern and afterwards, may be configured to estimate the place where the user terminal apparatus 100' based on a movement pattern. For example, if the movement pattern is changed from a running pattern to a stay pattern, the processor 130 may be configured to control the location detector 140 to detect the coordinate information at the point where the user terminal apparatus 100' is located at the time when the movement pattern is changed. The processor 130 may be configured to update the coordinate information regarding the time when the movement pattern is changed from the running pattern to the stay pattern or the place information corresponding to the coordinate information based on the detected coordinate information and the time information regarding the time when the coordinate information is detected.

The processor 130 may be configured to estimate the place where the user terminal apparatus 100' is located based on the form of the stay pattern until the stay pattern is changed to another movement pattern. If there is no change in the movement pattern for, for example, one hour after the movement pattern is changed from the running pattern to the stay pattern, the processor 130 may be configured to estimate that the location based on the coordinate information which is detected at the time when the movement pattern is changed from the running pattern to the stay pattern is almost identical to the present location.

If the movement pattern of the user terminal apparatus 100' is changed again within a predetermined time from the time when the coordinate information is detected by the location detector 140 for the last time (e.g., the immediately previous time), the processor 130 may be configured to estimate and detect the location based on the coordinate information which was detected from the last time as the location of the user terminal apparatus 100'.

For example, if it is determined that the location of the user terminal apparatus 100' detected by the location detector 140 is a user's office and the movement pattern of the user terminal apparatus 100' is changed again within ten minutes from the time when the location is detected, the processor 130 may be configured to estimate as the place where the user terminal apparatus 100' is currently located the place which was detected previously. For example, if the movement pattern is changed while more than 10 minutes have not elapsed after the location is detected by the location detector 140, the processor 130 may not receive a GPS signal, etc. to detect the location of the user terminal apparatus 100' again and may estimate the location of the user terminal apparatus 100' which was detected previously as the current location of the user terminal apparatus 100'.

The display 150 provides a user with the location of the user terminal apparatus 100' or place information corresponding to the location based on a signal processed by the processor 140. The display 150 may include, for example, various types of displays which may display an image, such as Cathode Ray Tube (CRT), Liquid Crystal Display (LCD), Light Emitting Diode (LED), Plasma Display Panel (PDP), etc.

The display 150 may further include an additional element based on its type. For example, if the display 150 uses a liquid crystal method, the display 150 may include a LCD display panel (not shown), a backlight unit (not shown) for providing light, and a panel drive substrate (not shown) for driving a panel (not shown).

The processor 130 may be configured to provide a user with the detected location of the user terminal apparatus 100' or information regarding the place corresponding to the location by displaying the same on the display 150.

If an application is executed on the user terminal apparatus 100', the processor 130 may be configured to provide the determined location or information regarding the place through an input of the application. For example, the application may include various applications such as a map application which displays a user's location on a map, an application for performing a navigation function, a chatting application, etc.

For example, if a map application is executed, the processor 130 may be configured to control the display 150 to display a map through the display 150 and display the determined estimated location of the user terminal apparatus 100' and information regarding the place on the map.

Figure 3:
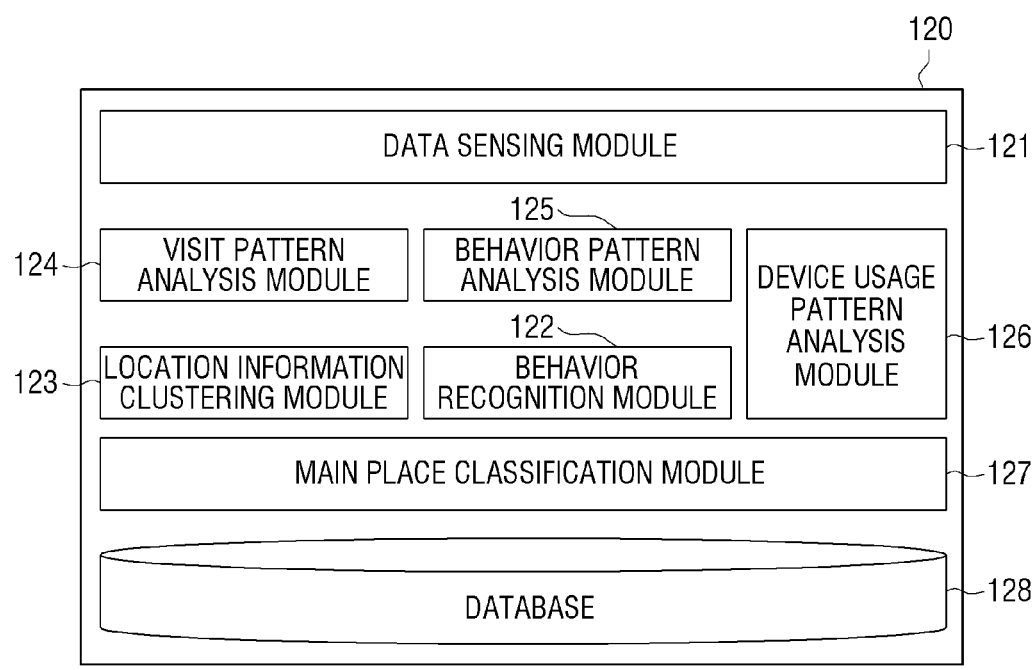
FIG. 3 is a block diagram illustrating an example configuration of a storage of a user terminal apparatus.

FIG. 3 is a block diagram illustrating an example configuration of a storage of a user terminal apparatus.

Referring to FIG. 3, the storage 120 may include, for example a data sensing module 121, a behavior recognition module 122, a location information clustering module 123, a visit pattern analysis module 124, a behavior pattern analysis module 125, a device usage pattern analysis module 126, a main place classification module 127, and a database 128. It will be understood that each or the foregoing example modules may be realized in hardware, firmware, software or any combination thereof.

The data sensing module 121 is a module configured to sense various data for estimating place information of the user terminal apparatus 100. For example, the processor 130 may be configured to execute the data sensing module 121 to sense movement data of the user terminal apparatus 100, data regarding an operation state (the state of application execution, the state of recharging, etc.), and data regarding Wi-Fi information or a Bluetooth beacon signal, etc. from a neighboring base station.

The movement recognition module 122 is a module to recognize a movement of the user terminal apparatus 100. The processor 130 may be configured to execute the movement recognition module 122 to recognize the type of movement, whether there is a movement to another place, and a means of transportation (subway, bus, car, etc.) based on a transport speed from movement data sensed by the sensor 110.

The location information clustering module 123 is a module to extract a place where a user has visited through clustering from a collected location record of the user terminal apparatus 100. For example, the processor 130 may be configured to execute the location information clustering module 123 to perform clustering with respect to a specific path which is formed based on the change of location of the user terminal apparatus 100, to extract coordinate information regarding the location where the user stays mostly, and to determine and update place information corresponding to the extracted coordinate information. In this example, the clustering may be performed based on information regarding how much the location record of the user terminal apparatus is concentrated and how long the user terminal apparatus has stayed at each location, which will be described in greater detail below with reference to FIGS. 7 and 8.

The visit pattern analysis module 124 is a module to estimate the place which a user is currently visiting by analyzing a visit pattern regarding the places visited by the user, which is determined through clustering. The processor 130 may be configured execute the visit pattern analysis module 124 and analyze the time of visit, the number and period of visit with respect to a place visited, etc. to estimate where is the place visited by the user.

The behavior pattern analysis module 125 is a module to estimate the place which is currently visited by a user by analyzing the behavior occurrence pattern of the user terminal apparatus 100 at each place visited. The processor 130 may be configured to execute the behavior pattern analysis module 125 and analyze the type, the frequency, the time of behavior, etc. to estimate where is the place visited by the user.

The device usage pattern analysis module 126 is a module to estimate the place visited by a user by analyzing the usage pattern of the user terminal apparatus 100. The processor 130 may be configured to execute the usage pattern analysis 126 and analyze the operation state of the user terminal apparatus 100, for example, information regarding an application which is executed, information regarding battery recharging, etc. to estimate the place visited by the user.

The main place classification module 127 is a module to finally classify the possible places visited by the user and determine where is the place visited by the user by combining information analyzed by the visit pattern analysis module 124, the behavior pattern analysis module 125 and the usage pattern analysis module 126. For example, the processor 130 may be configured to execute the main place classification module 127 and be provided with information regarding probability or score as to whether the corresponding place would be house, office, or a predetermined place from each pattern analysis module 124~126 to make final determination using the provided information. However, if there is data which cannot be collected or analyzed by the user terminal apparatus 100 or if power consumption of the user terminal apparatus 100 needs to be reduced, the processor 130 may be configured to perform data collecting selectively or control each pattern analysis module 124~126 to be executed selectively.

The database 128 stores a plurality of movement patterns and place information for each time period matching with each movement pattern. In addition, the database 128 may further store a plurality of state information regarding the operation of the user terminal apparatus 100 and place information matching each state information. Further, the database 128 may store a movement of the user terminal apparatus 100 which is sensed by the sensor 110 and coordinate information regarding a point where the user terminal apparatus 100 is located, which is detected by the location detector 140, and update the stored place information.

Figure 4:
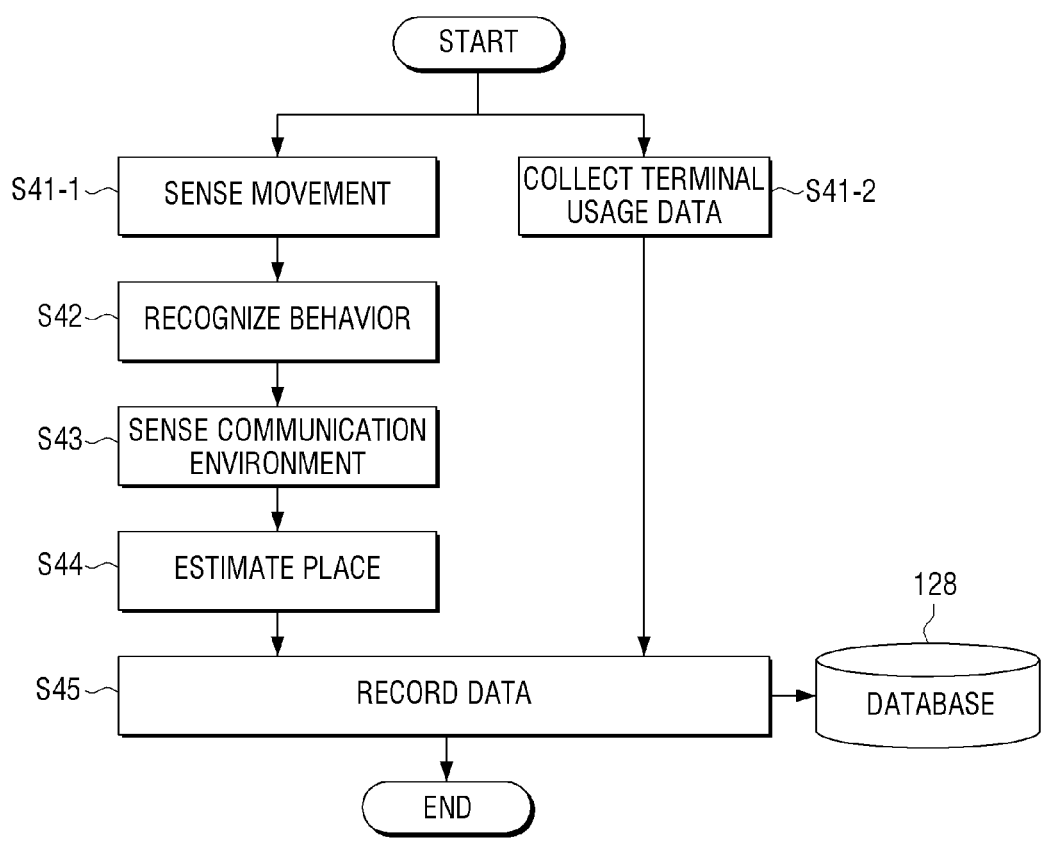
FIG. 4 is a flowchart illustrating an example method of estimating a place where a user terminal apparatus is located using a movement and usage data of the user terminal apparatus.

FIG. 4 is a flowchart illustrating an example method of estimating a place where a user terminal apparatus is located using a movement and usage data of the user terminal apparatus.

As illustrated in FIG. 4, the user terminal apparatus 100 senses a movement of the user terminal apparatus 100 through the sensor 110 (S41-1).

The processor 130 may be configured to extract a movement pattern from the sensed movement, and may be configured to recognize a user's behavior such as a user behavior, whether the user moves to another place, a transportation means, etc. using the extracted movement pattern and information regarding pre-stored movement patterns (S42).

In this example, the processor 130 may be configured to collect communication environment information such as Wi-Fi, Bluetooth or Cell information around the user terminal apparatus 100 through the location detector 140 (S43).

The processor 130 may be configured to estimate the place where the user terminal apparatus 100 is currently located using user behavior information recognized from the extracted movement pattern and place information for each time period matching with the user behavior information (S44). In this example, the processor 130 may be configured to estimate the place where the user terminal apparatus 100 is located through the collected communication environment information, or may be configured to analyze place information estimated from the movement pattern of the user terminal apparatus 100 and place information estimated from the communication environment information in a comprehensive manner to make final determination regarding the place where the user terminal apparatus 100 is currently located. For example, if there is communication environment information collected from an AP around the user terminal apparatus 10, it may be desirable to determine the place which is estimated from the communication environment information as the place where the user terminal apparatus 100 is located preferentially.

The processor 130 may be configured to record data including a movement pattern sensed by the user terminal apparatus 100, communication environment information, and a place determined from the communication environment information in the database 128 of the storage 120 (S45).

As a separate operation, the user terminal apparatus 100 may collect usage data of the user terminal apparatus 100 from the operation state of the user terminal apparatus 100 (S41-2). For example, the processor 130 may be configured to collect data where the user terminal apparatus is used, to match the data with the place which is determined based on each movement pattern of the user terminal apparatus 100 and the communication environment information and to record the matching information in the database 128.

The processor 130 may be configured to finally determine the place where the user terminal apparatus 100 is currently located from the usage data of the user terminal apparatus 100 by further using a plurality of usage data stored in the storage and the corresponding place information.

Figure 5:
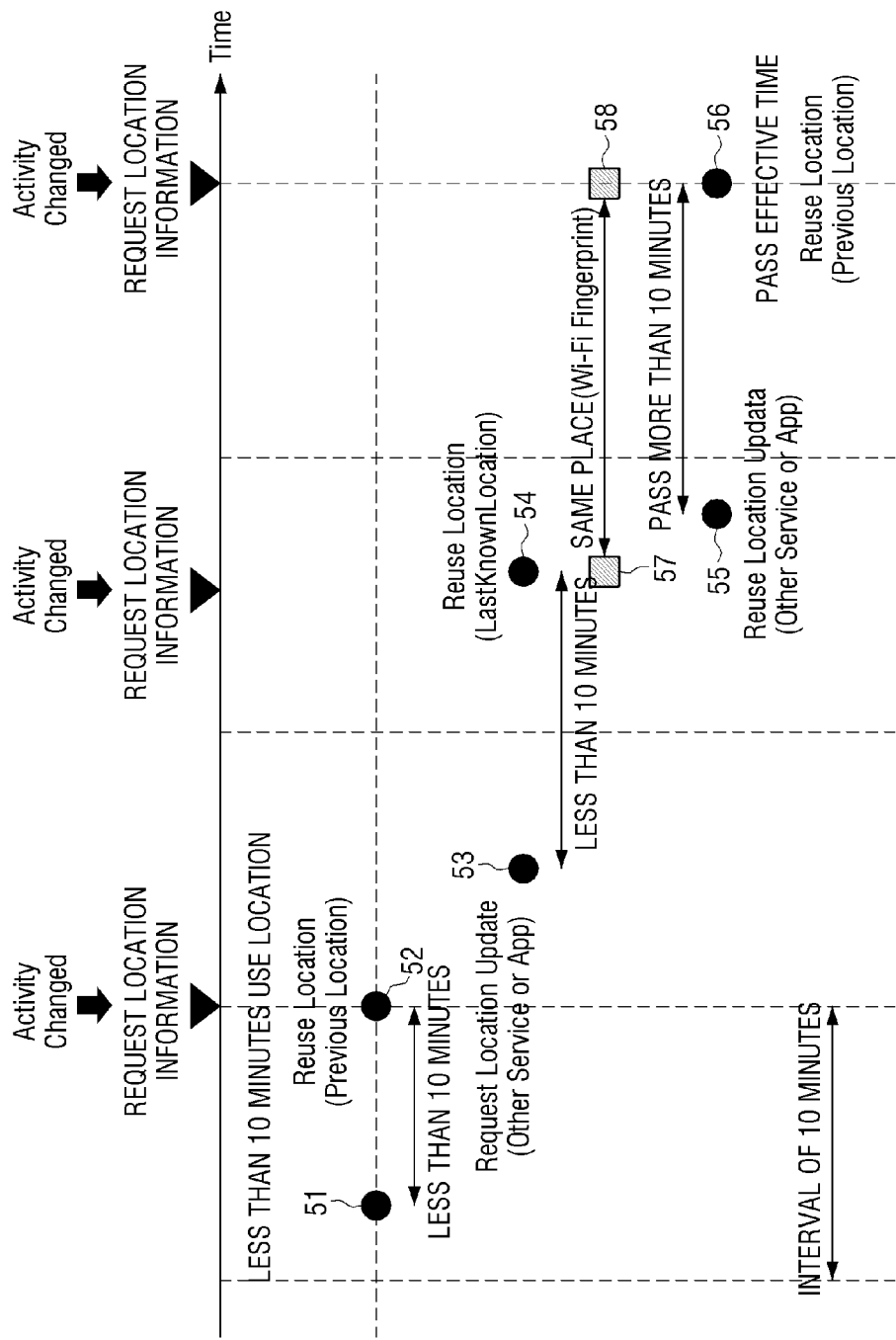
FIG. 5 is a diagram illustrating an example method of re-using coordinate information which is detected previously.

FIG. 5 is a diagram illustrating an example method of re-using coordinate information which is detected previously.

As illustrated in FIG. 5, if a movement pattern of the user terminal apparatus 100 is changed, coordinate information regarding the point where the user terminal apparatus 100 is located may be detected through the location detector 140. If the movement pattern is changed again before 10 minutes elapse from the point of time 51 when the coordinate information of the user terminal apparatus 100 is detected through GPS, etc., the processor 130 may be configured to provide a user with coordinate information at the point of time 51 when the coordinate information is detected for the last time or may update place information to the place information regarding a point of time 52 when the movement pattern is changed again.

If coordinate information regarding the point where the user terminal apparatus 100 is located is detected through GPS, etc. upon a request of an application as the application is executed and a movement pattern is changed before 10 minutes elapses from the point of time 53 when the coordinate information is detected, the processor 130 may be configured to reuse the coordinate information at the point of time 53 when the coordinate information is detected the last time and provide the information to a user, or may update place information to the place information at a point of time 54 when the movement pattern is changed.

In addition, when coordinate information regarding the point where the user terminal apparatus 100 is located is detected through GPS, etc. upon a request of an application as the application is executed, regardless of whether the movement pattern is changed before 10 minutes elapses from a point of time 55 when the coordinates information is detected, if communication environment information 57 at a certain point of time 54, for example, if WiFi-based fingerprint information 58 is identical to fingerprint information 57 at a certain point of time 54 is identical to the fingerprint information 57 at a point of time 56 when the movement pattern is changed, it may be determined that the location of the user terminal apparatus 100 at the point of time 56 when the movement pattern is changed is the same as the location at the certain point of time 54.

For convenience and ease of explanation, the reference time for the existing location information to be reused is assumed to be 10 minutes, but is not limited thereto. The reference time may be set to various times such as 5 minutes, 15 minutes, etc.

Figures 6A, 6B, 6C:
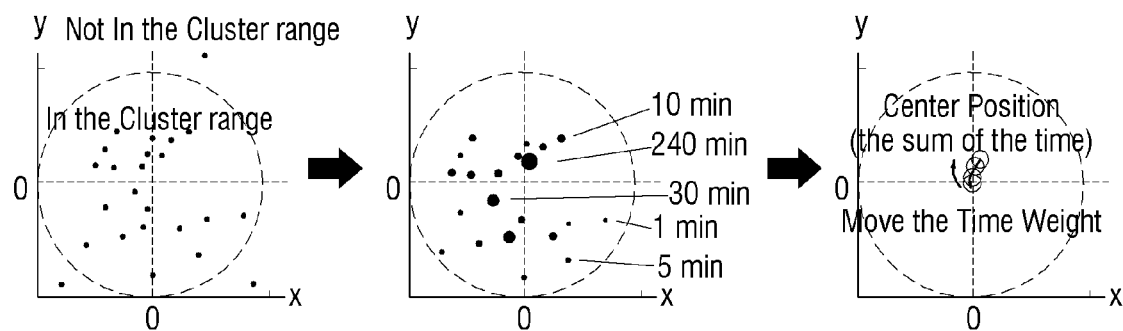
FIGS. 6A-6C are graphical diagrams illustrating an example method of extracting a representative place where a user terminal apparatus is located by clustering a plurality of coordinate information.

FIGS. 6A-6C are diagrams in the form of graphs illustrating an example method of extracting a representative place where a user terminal apparatus is located by clustering a plurality of coordinate information.

As illustrated in FIGS. 6A-6C, the processor 130 may be configured to extract main places that a user has visited by clustering collected location record. For example, as illustrated in FIG. 6A, if a plurality of coordinate information are collected based on a movement of the user terminal apparatus 100 which is sensed by a time period, the processor 130 may be configured to cluster the plurality of coordinate information to at least one cluster based on density of the plurality of coordinate information, to extract coordinate information at a center of the cluster based, for example, on a stay time for each coordinate information, and to update place information stored in the storage 120 based the extracted coordinate information.

FIG. 6A illustrates the locations where a movement pattern is determined to be a stay state using dots on x and y coordinates having a certain range. In this example, the locations where a movement pattern is determined to be a stay state are the points where coordinate information is detected when the movement pattern of the user terminal apparatus 100 is changed to a stay state. In FIG. 6A, a cluster range may for example, be determined with reference to the density of each dot. As illustrated in FIG. 6B, a weighted value regarding the time during which a user has stayed may be given to a location marked by each dot within the cluster. For example, the longer the user stated, the higher the weighted value given to the corresponding location. Referring to FIG. 6B, the highest weighted value is given to the location where the user has stayed for 240 minutes. The location where a relatively high weighted value is given is displayed in a relatively bigger dot. Referring to FIG. 6C, the processor 130 may be configured to extract a representative dot which represents dots of all locations where a movement pattern is determined to be a stay state, and to determine the extracted representative dot as the location where the user representing the corresponding cluster has stayed. As illustrated in FIG. 6C, the representative point may be located at a point which moves in a direction from the center position of the cluster to the point with a relatively high weighted value.

Figure 7:
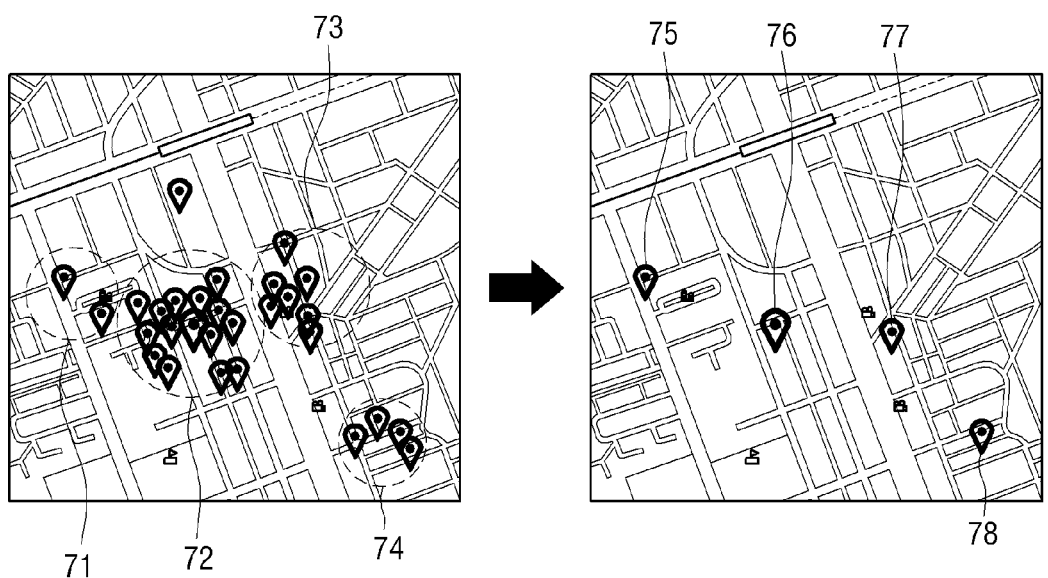
FIG. 7 is a diagram illustrating an example of a representative place extracted on a map.

FIG. 7 is a diagram illustrating an example representative place extracted on a map.

As illustrated in FIG. 7, the processor 130 may be configured to display a marker on each coordinate which is detected based on the coordinate information detected at a time when the movement pattern is changed, for example, to a stay state on the map displayed on the user terminal apparatus 100. The map displayed on the user terminal apparatus 100 may, for example, be a screen which is executed by a map application providing a location search service.

The processor 130 may be configured to extract each of the representative dots 75~78 representing each cluster by clustering each of the clusters 71~74 with reference to density of each of the displayed markers. The extracted representative dots may be stored along with a time period during which the user terminal apparatus has stayed at each cluster and may be displayed at a representative location which is sensed as a stay state at a specific time period.

Figure 8:
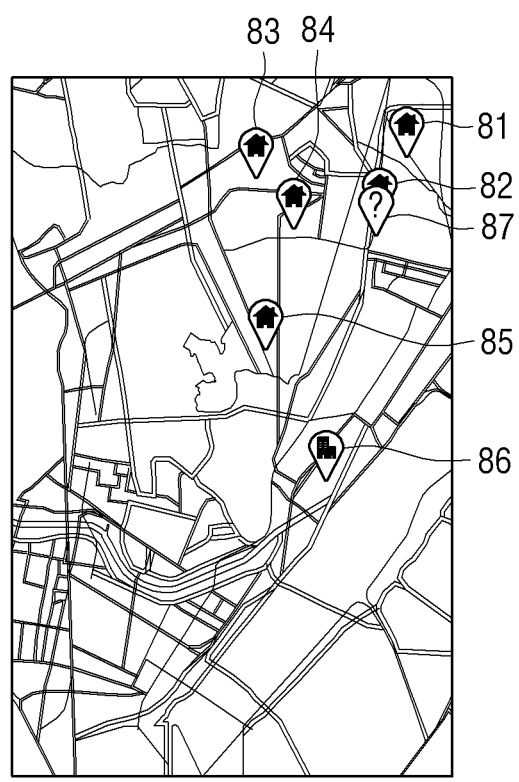
FIG. 8 is a diagram illustrating an example of a representative place marked and displayed on a map.

FIG. 8 is a diagram illustrating an example representative place marked and displayed on a map.

As illustrated in FIG. 8, the processor 130 may be configured to display locations 81~87 where a user visits and stays repeatedly at a specific time period. If the user registers place information corresponding to the locations in the user terminal apparatus 100, the processor 130 may be configured to display marks 81~86 which are icons in the form of house or office at the corresponding places, and display a mark 87 in the form of question mark at a location where place information is not registered.

Figure 9A:
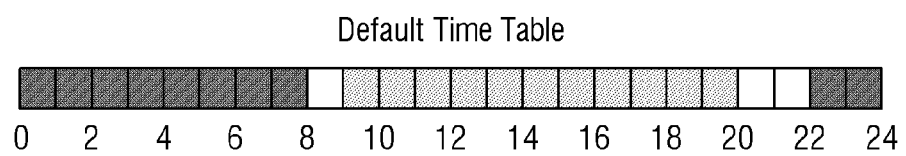
FIGS. 9A and 9B are diagrams illustrating an example of defining a time table corresponding to a visit pattern.
Figure 9B:
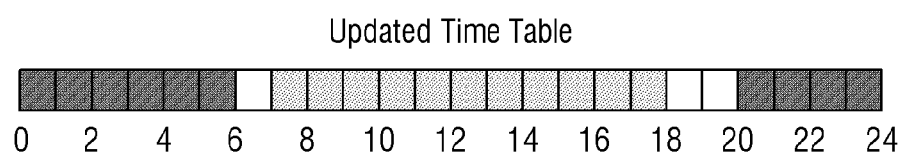

FIGS. 9A and 9B are diagrams illustrating an example of defining a time table corresponding to a visit pattern.

As illustrated in FIGS. 9A-9B, the processor 130 may be configured to define a visit pattern based on a time that a user has visited a plurality of places in a time table stored in the storage 120. In the time table, the places which are regularly visited by the user are classified by a time period and displayed. For example, if it is determined that the user has visited a certain place at a certain time period, the processor 130 may be configured to determine the place matching with the corresponding time period based on the time table.

As illustrated in FIG. 9A, the default time table may define that a user stays at home from 10:00 pm to 8:00 am, at an office from 9:00 am to 8:00 pm, is on the move from the house to the office from 8:00 am to 9:00 pm, and is on the move from the office to the house from 8:00 pm to 10:00 pm. The processor 130 may be configured to analyze a movement pattern of the user terminal apparatus 100 at a specific time period and estimate the place where the user terminal apparatus 100 is located using the time table.

For example, if a movement of the user terminal apparatus 100 at 3:00 pm is recognized as a movement pattern of a stay state, the processor 130 may be configured to estimate that the user terminal apparatus 100 is located at the office based on the time table. If the movement of the user terminal apparatus 100 is recognized as a moving state (walking, running or riding) at 9:00 pm, the processor 130 may be configured to estimate that the user terminal apparatus 100 is between the office and the house based on the time table. In this example, the location of the user terminal apparatus 100 may be estimated based on the time which takes to move between the office and the house.

As illustrated in FIG. 9B, the time table may be configured as a dynamic time table where a time period is changed based on a user's visit pattern. If a user's visit pattern is repeated such that the user stays at home from 8:00 pm to 6:00 am, stays at the office from 7:00 am to 6:00 pm, is on the move from the house to the office from 6:00 am to 7:00 am, and is on the move from the office to the house from 6:00 pm to 8:00 pm, the time period for determining a place may be changed with reference to 6:00 am, 7:00 am, 6:00 pm and 8:00 pm where the movement pattern is changed.

Figure 10:
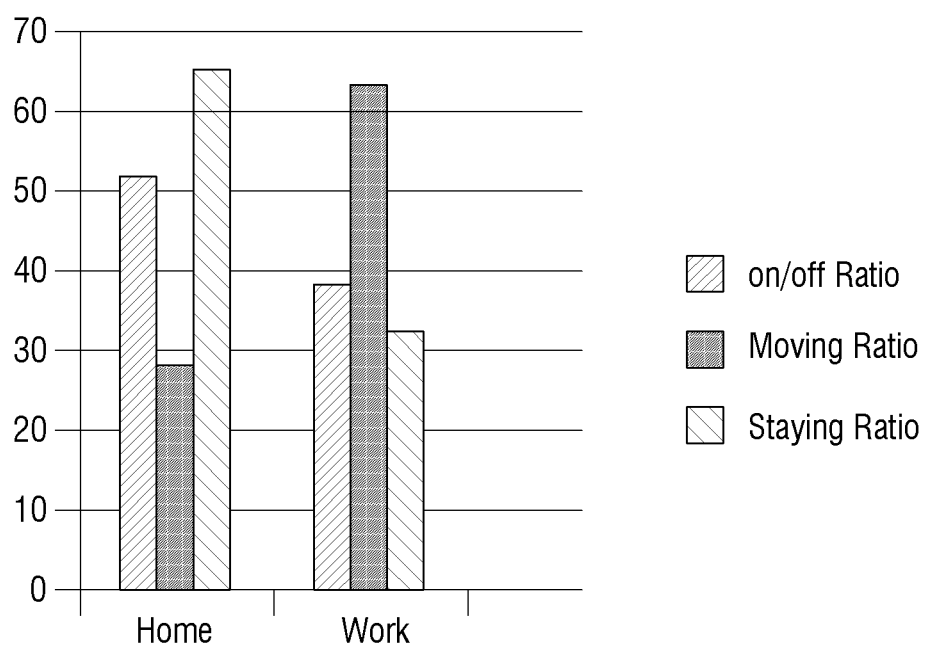
FIG. 10 is a graph illustrating example characteristics of a behavior pattern for each place.

FIG. 10 is a graph illustrating characteristics of an example behavior pattern for each place.

As illustrated in FIG. 10, the processor 130 may be configured to estimate a place by analyzing a behavior pattern in each place. For example, a behavior in the user terminal apparatus 100 may have a different pattern based on each place. Referring to FIG. 10, the number of turning on/off the screen of the user terminal apparatus 100 is higher at home than in the office. Accordingly, the on/off ratio in the house is higher than the on/off ratio in the office. The number of changes in the movement of the user terminal apparatus 100 is lower at home than in the office. Accordingly, the moving ratio is lower in the house than in the office. In addition, the time for the user terminal apparatus 100 remains unchanged is longer in the house than in the office. Accordingly, the staying ratio is higher in the house than in the office.

As such, the processor 130 may be configured to analyze a behavior at each place and extract and learn a behavior pattern in each of a plurality of places to estimate a place based on a behavior recognized at each place.

Figure 11:
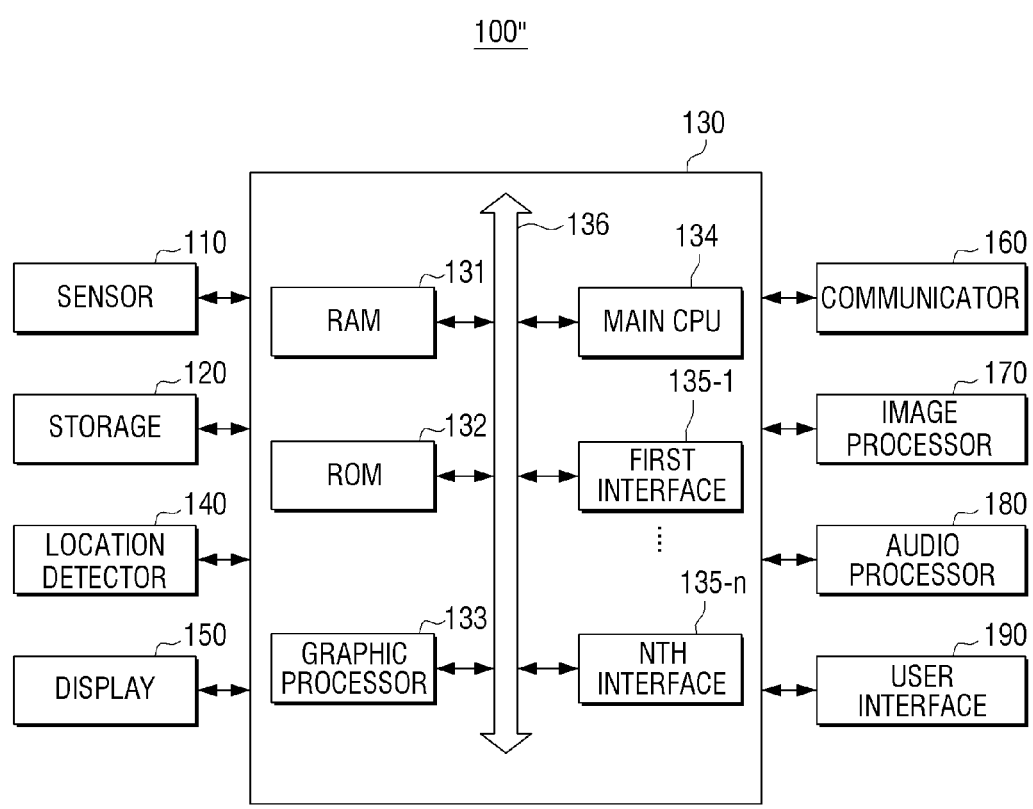
FIG. 11 is a block diagram illustrating an example configuration of a user terminal apparatus.

FIG. 11 is a block diagram illustrating an example configuration of a user terminal apparatus.

As illustrated in FIG. 11, a user terminal apparatus 100" may include, for example the sensor 110, the storage 120, the processor 130, the location detector 140, the display 150, a communicator (e.g., including communication circuitry) 160, an image processor (e.g., including processing circuitry) 170, an audio processor (e.g., including processing circuitry) 180, and a user interface 190. Hereinafter, the description regarding the elements which are the same or similar with those in FIGS. 1 and 2 may not be provided.

The storage 120 may store various modules to drive the user terminal apparatus 100".

For example, the storage 120 may further store a base module which processes a signal transmitted from each hardware included in the user terminal apparatus 100", a storage module which manages the database 128 or a registry, a security module, a communication module, etc.

The communicator 160 performs communication with an external apparatus according to various types of communication methods. The communicator 160 may include communication circuitry, for example, in the form of a Wi-Fi chip, a Bluetooth chip, a wireless communication chip, etc., and the processor 130 may be configured to perform communication with an external apparatus through the communicator 160.

The image processor 170 performs various image processing with respect to an input image, such as decoding, scaling, noise filtering, frame rate conversion, resolution conversion, etc.

The audio processor 180 processes audio data.

The user interface 190 senses a user interaction to control the overall operations of the user terminal apparatus 100". For example, the user interface 195 may include various interaction sensing apparatuses such as a camera (not shown), a microphone (not shown), etc.

The processor 130 may be configured to control the overall operations of the user terminal apparatus 100" using various modules stored in the storage 120.

As illustrated in FIG. 11, the processor 130 may be configured such that a RAM 131, a ROM 132, a CPU 133, a graphic processor 134, first to nth interface 135-1~135-n, etc. may be connected through a bus 136.

The ROM 132 stores a set of commands for system booting. The CPU 133 copies various application programs stored in the storage 120 in the RAM 131, and performs various operations by executing the application programs copied in the RAM 131.

The graphic processor 134 generates a screen including various objects such as an icon, an image, a text, etc. using an computing unit (not shown) and a rendering unit (not shown). The computing unit computes property values such as coordinates, shape, size, and color of each object to be displayed according to the layout of the screen. The rendering unit generates a screen with various layouts including objects based on the property values computed by the computing unit.

The CPU 133 accesses the storage 120 and performs booting using an O/S stored in the storage 120. The CPU 133 performs various operations using various programs, contents, data, etc. stored in the storage 120.

The first to the nth interfaces (135-1 to 135-n) are connected to the above-described various elements. One of the interfaces may be a network interface connected to an external apparatus via network.

Figure 12:
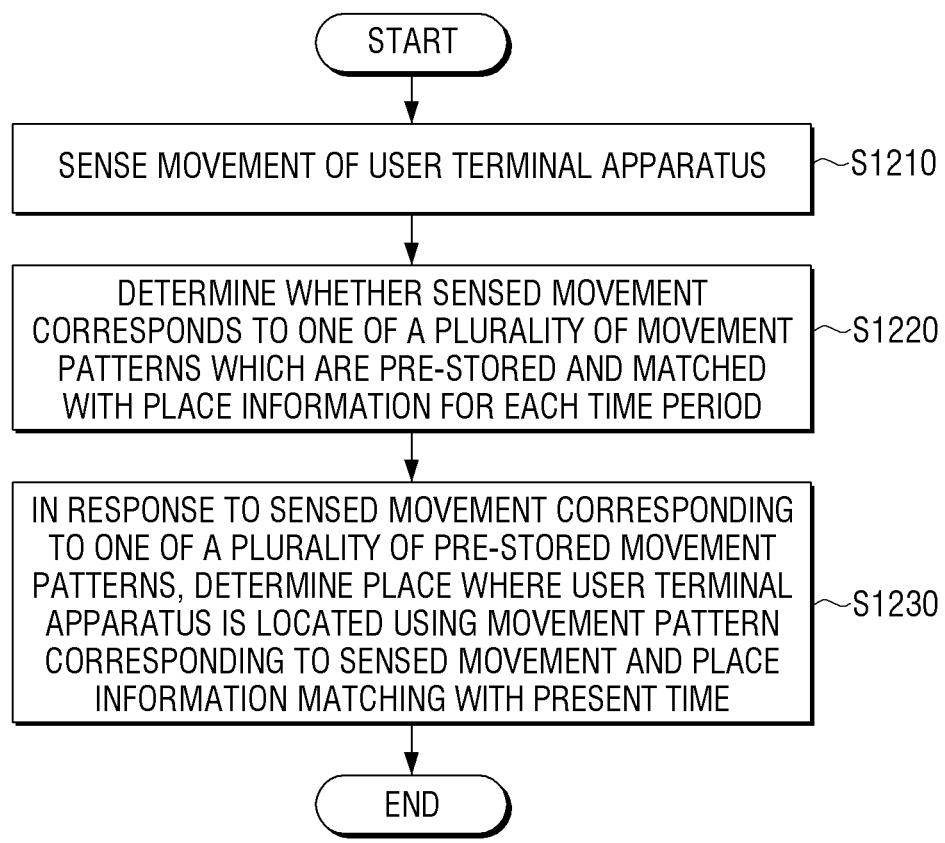
FIG. 12 is a flowchart illustrating an example method of controlling a user terminal apparatus.

FIG. 12 is a flowchart illustrating an example method of controlling a user terminal apparatus.

Referring to FIG. 12, a movement of the user terminal apparatus 100 may be sensed (S1210).

It may be determined whether the sensed movement corresponds to one of a plurality of movement patterns which are pre-stored and matched with place information for each time period (S1220). For example, the movement patterns may include at least one of the first movement pattern where a movement to a place at a speed exceeding a critical range is sensed for more than a predetermined time, the second movement pattern where a movement to a place at a speed less than a critical range is sensed for more than a predetermined time, and the third movement pattern where a movement to a place is not sensed for more than a predetermined time.

If a sensed movement corresponds to one of the plurality of the pre-stored movement patterns, the place where the user terminal apparatus is located is determined using the movement pattern corresponding to the sensed movement and the place information matching with the present time (S1230).

In this example, when a movement pattern of the user terminal apparatus 100 is changed, the coordinate information regarding the current location of the user terminal apparatus 100 is detected, and the place information for each time period may be updated using the time information regarding the point of time when the coordinates information is detected and the pre-stored coordinate information regarding the location corresponding to the place information. In this example, if a plurality of coordinate information are detected based on the movement of the user terminal apparatus 100 which is sensed by each time period, the plurality of coordinate information are clustered in at least one cluster based on the density of the plurality of coordinate information, the coordinate information at the center of the cluster is extracted based on a stay time for each coordinate information, and the place information for each time period may be updated based on the extracted coordinate information.

In addition, if the movement pattern of the user terminal apparatus 100 is changed again within a predetermined time from the time when the coordinate information is detected the last time, the location based on the coordinate information which is detected the last time may be estimated and detected as the location of the user terminal apparatus 100.

Further, it may be determined whether the operation state of the user terminal apparatus 100 corresponds to one of a plurality of pre-stored state information regarding the operation information of the user terminal apparatus 100 which is matched with place information. In this example, if the operation state of the user terminal apparatus 100 corresponds to one of the plurality of the pre-stored state information, the place where the user terminal apparatus 100 is located may be determined by further using the place information corresponding to the operation state of the user terminal apparatus 100.

According to the above-described various example embodiments, the place where a user terminal apparatus is located may be estimated efficiently while reducing power consumption caused by the operation of a GPS.

The method of controlling a user terminal apparatus according to the above-described various example embodiments may be realized as a program and stored in various recording media. For example, a computer program which is processed by various processors to execute the above-described various controlling methods may be stored and used in recording media.

For example, a non-transitory computer readable medium storing a computer program which includes the step of sensing a movement of a user terminal apparatus, determining whether the sensed movement corresponds to one of a plurality of pre-stored movement patterns which are matched with place information for each time period, and in response to the sensed movement corresponding to one of the plurality of the pre-stored movement patterns, determining the place where the user terminal apparatus is located using a movement pattern corresponding to the sensed movement and the place information matching with the present time may be provided.

For example, various applications and programs as described above may be stored and provided in a non-transitory computer readable medium, such as, a CD, a DVD, a hard disc, a Blu-ray disc, a USB, a memory card, and a ROM.

The foregoing example embodiments and advantages are merely examples and are not to be construed as limiting the disclosure. The disclosure can be readily applied to other types of apparatuses. Also, the description of the example embodiments of the disclosure is intended to be illustrative, and not to limit the scope of the claims, and many alternatives, modifications, and variations will be apparent to those skilled in the art.

What is claimed is:

1. A user terminal apparatus, comprising:
a sensor, comprising at least one of an acceleration sensor, a magnetic sensor and a gyro sensor, configured to sense a movement of the user terminal apparatus;
a storage configured to store a plurality of movement patterns and a plurality of place, each of the plurality of place is matching with each of the plurality of movement pattern; and
a processor configured to, in response to the movement of the user terminal apparatus being sensed, determine a movement pattern corresponding to the sensed movement among the plurality of movement pattern, and determine a place matching the determined movement pattern among the plurality of place as a place where the user terminal apparatus is located at a present time.

2. A user terminal apparatus, comprising:
a sensor configured to sense a movement of the user terminal apparatus and coordinate information of a point where the user terminal apparatus is located;
a storage configured to store a plurality of movement patterns, place information for a time period matching each movement pattern and coordinate information of a location corresponding to the place information for each time period;
a processor configured to:
in response to a movement of the user terminal apparatus sensed by the sensor corresponding to one of the plurality of movement patterns, determine an estimated place where the user terminal apparatus is located using a movement pattern corresponding to the sensed movement and place information matching a present time,
in response to a movement pattern of the user terminal apparatus being changed, control the sensor to sense coordinate information of a current location of the user terminal apparatus, and
update place information stored in the storage using the sensed coordinate information and time information regarding a point of time when the coordinate information is sensed.

3. The apparatus as claimed in claim 2, wherein the processor, in response to a movement pattern of the user terminal apparatus being changed within a predetermined time from a time when the coordinate information is sensed at a last previous time by the location detector circuitry, is configured to estimate and to sense a location based on the coordinate information sensed the last previous time as a location of the user terminal apparatus.

4. The apparatus as claimed in claim 2, wherein the processor, in response to a plurality of coordinate information being sensed based on a movement of the user terminal apparatus which is sensed by a time period, is configured to cluster the plurality of coordinate information in at least one cluster based on a density of the plurality of coordinate information, to extract coordinate information at a center of the cluster based on a stay time for each coordinate information, and to update place information stored in the storage based on the extracted coordinate information.

5. The apparatus as claimed in claim 1, wherein the movement pattern includes at least one of a first movement pattern in which a movement to a place at a speed exceeding a critical range is sensed for more than a predetermined time, a second movement pattern in which a movement to a place at a speed less than a critical range is sensed for more than a predetermined time, and a third movement pattern in which a movement to a place is not sensed for more than a predetermined time.

6. The apparatus as claimed in claim 2, wherein the storage further stores state information regarding an operation of the user terminal apparatus and place information matching each state information,
wherein the processor is configured to estimate a place where the user terminal apparatus is located further using place information corresponding to an operation state of the user terminal apparatus from among place information matching state information stored in the storage.

7. The apparatus as claimed in claim 1, further comprising:
a display,
wherein the processor, in response to a map application being executed, is configured to control the display to display a map and to display the determined place on the map.

8. The apparatus as claimed in claim 1, wherein the processor, in response to an application being executed, is configured to provide the determined estimated place as an input of the application.

9. A method of controlling a user terminal apparatus, comprising:
sensing a movement of the user terminal apparatus by at least one of an acceleration sensor, a magnetic sensor and a gyro sensor;
determining a movement pattern corresponding to the movement of the user terminal apparatus among a plurality of pre-stored movement patterns, each of the plurality of pre-stored movement pattern is matching with each of a plurality of pre-stored place; and
determining a place matching the determined movement pattern among the plurality of place as a place where the user terminal apparatus is located at a present time.

10. A method of controlling a user terminal apparatus, comprising:
sensing a movement of the user terminal apparatus and coordinate information of a point where the user terminal apparatus is located;
determining whether the sensed movement corresponds to one of a plurality of pre-stored movement patterns which are matched with place information corresponding to coordinate information for each time period;
in response to the sensed movement corresponding to one of the plurality of pre-stored movement patterns, determining an estimated place where the user terminal apparatus is located using a movement pattern corresponding to the sensed movement and place information matching a present time; and
in response to a movement pattern of the user terminal apparatus being changed, sensing coordinate information of a current location of the user terminal apparatus, and
updating place information stored using the sensed coordinate information and time information regarding a point of time when the coordinate information is sensed.

11. The method as claimed in claim 10, wherein the detecting comprises, in response to a movement pattern of the user terminal apparatus being changed within a predetermined time from a time when the coordinate information is sensed a last previous time, estimates and detects a location based on the coordinate information sensed the last previous time as a location of the user terminal apparatus.

12. The method as claimed in claim 10, wherein the updating comprises:
in response to a plurality of coordinate information being sensed based on a movement of the user terminal apparatus, which is sensed by a time period, clustering the plurality of coordinate information in at least one cluster based on a density of the plurality of coordinate information; and
extracting coordinate information at a center of the cluster based on a stay time for each coordinate information, and updating place information stored for the time period based on the extracted coordinate information.

13. The method as claimed in claim 9, wherein the movement pattern includes at least one of a first movement pattern where a movement to a place at a speed exceeding a critical range is sensed for more than a predetermined time, a second movement pattern where a movement to a place at a speed less than a critical range is sensed for more than a predetermined time, and a third movement pattern where a movement to a place is not sensed for more than a predetermined time.

14. The method as claimed in claim 10, further comprising:
determining whether an operation state of the user terminal apparatus corresponds to one of a plurality of pre-stored state information regarding an operation of the user terminal apparatus matched with place information and,
wherein the determining a place of the user terminal apparatus comprises, in response to an operation state information of the user terminal apparatus corresponding to one of the plurality of pre-stored state information, determining a place where the user terminal apparatus is located further using place information corresponding to the operation state of the user terminal apparatus.

15. The method as claimed in claim 9, further comprising:
in response to a map application being executed, displaying a map and displaying the estimated place on the map.

16. The method as claimed in claim 9, further comprising:
in response to an application being executed, providing the estimated place as an input of the application.

* * * * *